(12) United States Patent
Lin

(10) Patent No.: US 6,363,842 B1
(45) Date of Patent: Apr. 2, 2002

(54) INDOOR GRILL WITH FILTER

(76) Inventor: Yu-Yuan Lin, #72-1 Shin-Lo Road, Tainan (TW), 702

( * ) Notice: Subject to any disclaimer, the term of this patent is extended or adjusted under 35 U.S.C. 154(b) by 0 days.

(21) Appl. No.: 09/757,790

(22) Filed: Jan. 10, 2001

(51) Int. Cl.[7] .......................... A47J 37/06; A47J 37/08; F24C 9/00; F24C 15/20

(52) U.S. Cl. .................... 99/425; 55/408; 55/DIG. 36; 126/299 R; 126/299 D; 99/400; 99/422; 99/446

(58) Field of Search .................. 99/400, 401, 339, 99/340, 422–425, 444–450, 474, 476, 480; 55/408, 497, 521, 322, 504, 509, DIG. 36; 126/299 R, 299 D, 299 E, 299 B, 21 A, 21 R, 41 R, 39 R, 300, 303; 219/400, 408, 443, 521, 386

(56) References Cited

U.S. PATENT DOCUMENTS

| | | | |
|---|---|---|---|
| 3,487,199 A | 12/1969 | Hamlin | |
| 3,719,137 A * | 3/1973 | Gould | 129/299 D |
| 3,933,145 A * | 1/1976 | Reich | 99/476 |
| 3,943,837 A | 3/1976 | Trkla | |
| 3,956,979 A | 5/1976 | Coroneos | |
| 4,034,663 A * | 7/1977 | Jenn et al. | 99/446 |
| 4,066,425 A * | 1/1978 | Nett | 55/DIG. 36 |
| 4,072,092 A * | 2/1978 | Kohli et al. | 99/386 X |
| 4,158,992 A | 6/1979 | Malafouris | |
| 4,446,849 A * | 5/1984 | McFarland | 126/299 R |
| 4,655,194 A * | 4/1987 | Wooden | 126/299 D |
| 4,663,517 A | 5/1987 | Huff et al. | |
| 4,736,729 A * | 4/1988 | Beach | 126/21 A |
| 4,827,903 A | 5/1989 | Kim | |
| 5,000,085 A * | 3/1991 | Archer | 99/445 |
| 5,140,896 A | 8/1992 | Duran | |
| 5,195,425 A | 3/1993 | Koziol | |
| 5,203,316 A | 4/1993 | Pritchett | |
| 5,280,749 A * | 1/1994 | Smit | 99/422 |
| 5,297,534 A | 3/1994 | Louden | |
| 5,367,950 A | 11/1994 | Sarich | |
| 5,404,801 A | 4/1995 | Holland | |
| 5,536,518 A | 7/1996 | Rummel | |
| 5,649,475 A | 7/1997 | Murphy et al. | |
| 5,719,377 A | 2/1998 | Giebel et al. | |
| 5,752,433 A | 5/1998 | Charlson et al. | |
| 5,782,168 A | 7/1998 | Krhnak | |
| 5,801,357 A | 9/1998 | Danen | |
| 5,845,562 A | 12/1998 | Deni et al. | |
| 5,848,567 A | 12/1998 | Chiang | |
| 5,884,619 A * | 3/1999 | Terry | 126/299 D |
| 5,906,195 A * | 5/1999 | Georgaras | 126/299 D |
| 5,934,180 A | 8/1999 | Lin | |
| D423,280 S | 4/2000 | Lin | |
| 6,142,142 A * | 11/2000 | Woodall, III et al. | 55/408 X |

* cited by examiner

*Primary Examiner*—Timothy F. Simone
(74) *Attorney, Agent, or Firm*—Dilworth & Barrese, LLP

(57) ABSTRACT

A grill for indoor cooking includes a base which has a grilling surface on a top surface thereof and a stanchion which extends vertically from the base. The grill also includes a filter unit which has a hood having a downwardly-depending post which telescopically engages the stanchion such that the filter unit is selectively positionable in a vertical direction relative to the base. The filter unit includes a selectively removable filtering element for removing contaminants from a medium which emanates from the grilling surface into the air during grilling. A ventilation system creates an air flow for drawing the medium through the filtering element.

22 Claims, 5 Drawing Sheets

INDOOR GRILL WITH FILTER

BACKGROUND

1. Field of the Disclosure

The present disclosure relates generally to indoor grills and more particularly to a free-standing, indoor grill which includes a height adjustable filter unit for cleaning the smoke, fumes and other contaminants which inundate the air as a result of grill-style cooking.

2. Description of the Related Art

Outdoor charcoal or gas barbecuing is a popular method of cooking and preparing various foods such as meats, poultry, fish and vegetables and manufacturers have enjoyed great commercial success providing outdoor barbecues and accessories in the United States and elsewhere. Part of the popularity of outdoor barbecuing can be attributed to the unique blend of smell, flavor and look the briquettes convey to the meat, fish, and/or vegetables which is often referred to as "barbecue", "smoke" or "charcoal" flavor. However, due to the obvious safety concerns of burning briquettes indoors, barbecuing has typically been recognized as an outdoor cooking activity.

Recently, however, manufacturers have been looking for ways to manufacture grills for barbecuing indoors which imitate the various cooking advantages of outdoor barbecues, e.g., the smell, taste and look of barbecued food. For example, electric indoor barbecues provide one method of safely barbecuing indoors and some of these designs include electric hotplates with grill-like surfaces for conveying a grill like look to the food and for allowing the fat/grease to drip from the food onto the heating element to flavor and/or "smoke" the food.

However, since the amount of dripping fat differs among various food types, e.g., chicken versus sausage, the amount of smoke emanating from the heating elements is often difficult to control which can quickly spoil the charm of indoor barbeque grilling. Moreover and especially with indoor grilling, the smoke and/or fumes emanating off the heating elements should be filtered prior to introduction into the surrounding area. As a result and due to the convenience of other cooking methods and appliances such as ovens and stoves which offer a wider range of cooking options, e.g., baking, broiling, frying, etc., indoor barbecuing is not commonplace.

U.S. Pat. No. 5,404,801 to Holland discloses an outdoor barbecue unit which includes a replaceable filtration element for removing contaminants from the smoke as the smoke exits a smoke exhaust cylinder mounted atop the barbecue hood. U.S. Pat. No. 4,827,903 to Kim discloses a table mounted cooker which includes a filter which removes contaminants from the smoke exhaust as the smoke exhaust is drawn through a chimney or ventilation system. Movement of the filter relative to the cooking surface is limited to removal of the filter from the unit, i.e., the filter is not positionable relative to the cooking surface.

As can be appreciated, these units are somewhat complicated and may not be suitable for ordinary indoor use. Moreover, separate ventilation systems or exhaust connections may be required which, again, are typically not suitable for ordinary indoor use. Thus, there exists a need to develop a free-standing, easy-to-use indoor grill having a height-adjustable filter unit for filtering contaminants, fumes and odors which emanate from the grilling surface during grilling.

SUMMARY

The present disclosure relates to a free-standing grill for indoor cooking which includes a base having a grilling surface on the top surface thereof and a stanchion which extends vertically from the base. The grill also includes a filter unit which has a hood having a downwardly-depending post which telescopically engages the stanchion of the base such that the filter unit can be selectively positioned in a vertical direction relative to the base and the grilling surface. Preferably, the filter unit includes a selectively removable filtering element for removing contaminants from a medium (i.e., smoke, fumes, odor, contaminants, etc.) which emanates from the grilling surface into the air during grilling. A ventilation system creates an air flow for drawing the medium through the filtering element for cleaning.

In one embodiment, the filter unit includes a hinge which permits pivotable movement of the filter unit relative to the base. The grill may also include a pair of locking tabs which cooperate to selectively position and lock the filter unit at various positions above the grilling surface.

In another embodiment, the ventilation system includes a motor which operates a fan for creating the air flow to draw the medium and contaminants through the filtering element. Preferably, the fan includes a variable switch which regulates the speed of the fan and the resulting air flow of the medium and contaminants through the filtering element.

In still yet another embodiment, the base includes an inner peripheral edge which defines a furrow between the inner peripheral edge and the grilling surface. Preferably, the furrow is dimensioned to collect cooking excretions which result during cooking. The grilling surface may be contoured and/or include a plurality of raised projections having grooves defined therebetween which cooperate to direct the flow of cooking excretions into the furrow. The base may also include a selectively removable trap for collecting the cooking excretions from the furrow and/or grilling surface.

DETAILED DESCRIPTION OF THE PREFERRED EMBODIMENTS

Figure 1:
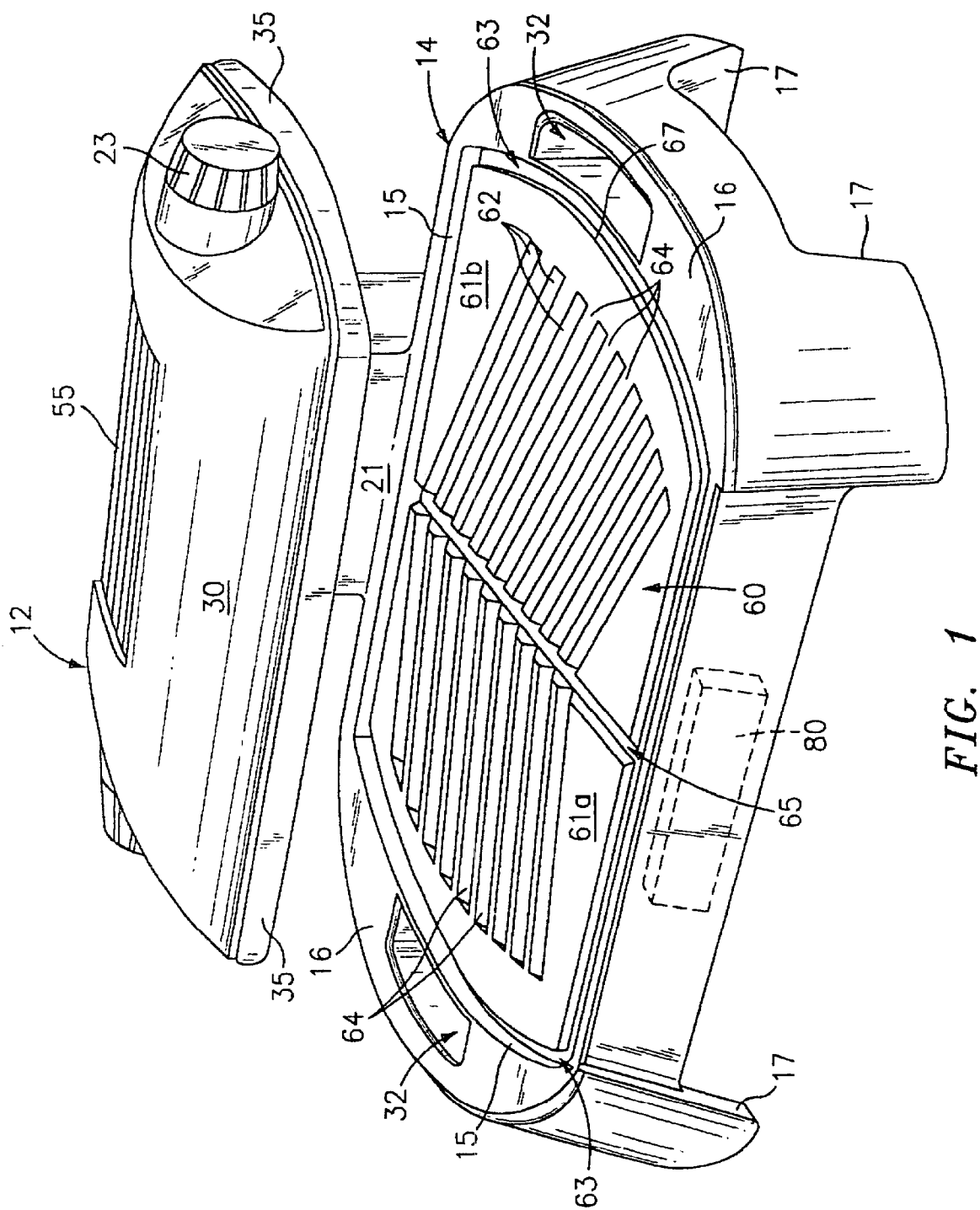
FIG. 1 is a top, perspective view of an indoor grill according to the present disclosure showing a filter unit in cooking position and a grease trap shown in phantom.

Referring now to the drawings in which like reference numerals identify similar or identical components throughout several views, there is illustrated a free-standing indoor grill 10 (hereinafter generally referred to as "grill 10") in accordance with the principles of the present disclosure. Grill 10 includes a base 14 and a filter unit 12 which generally reside in opposing parallel relation to one another.

Preferably, base 14 is generally rectangular in dimension and includes a top surface 16, a bottom surface 31 (See FIG. 6) and four legs 17 which depend from the top surface 16 and support grill 10 in an upright, free-standing position.

The top surface 16 of base 14 also includes an inner periphery 15 which defines a recess 20 for seating a grilling surface 60 generally positioned below the filter unit 12. It is envisioned that legs 17 cooperate to support the base 14 above a counter top or other table-like surface such that the heat emanating from beneath the grilling surface 60 will dissipate and reduce the chances of the surface marring as a result of the high cooking temperature of the grilling surface 60.

As shown best in FIGS. 1, 2, 3 and 4, base 14 also includes a stanchion 21 which extends upwardly from the base 14. Preferably, stanchion 21 is integrally associated with a rear edge 19 of base 14 and is dimensioned to telescopically couple to a post 22 which is associated with the filter unit 12 which will be described in greater detail below. It is envisioned that stanchion 21 may be hollow such that an electrical power source, i.e., cord or battery (not shown) can be channeled therethrough or disposed therein.

It is also envisioned that only one of the post 22 or the stanchion 21 may be affixed to the filter unit 12 or base 10, respectively, in such a manner that the filter unit 12 is movable relative to the base 10. In addition, other mechanical apparatii may be employed to move the filter unit 12 relative to the base 10, e.g., gears, hydraulics, levers, screw-like devices, etc.

Filter unit 12 includes a generally flare-like intake hood 30 which defines an internal intake chamber 48 which serves to capture the medium, i.e., smoke, fumes, and contaminants from the grilling surface 60 and direct the smoke, fumes and contaminants into a filtering element 50 disposed within filter unit 12 as described below. For the purposes herein, the term "contaminants" is defined as any natural by-product which may become airborne as a result of grill-style cooking, e.g., grease particles, oil splatter, etc. Filter unit 12 also includes an outer rim or lip 35 disposed about the outer periphery of hood 30 which further defines intake chamber 48. It is envisioned that the intake hood 30 can be any geometric configuration having a flare-like appearance which serves to capture the smoke, fumes and contaminants from the grilling surface 60 and direct the smoke, fumes and contaminants into the filtering element 50.

Figure 8:
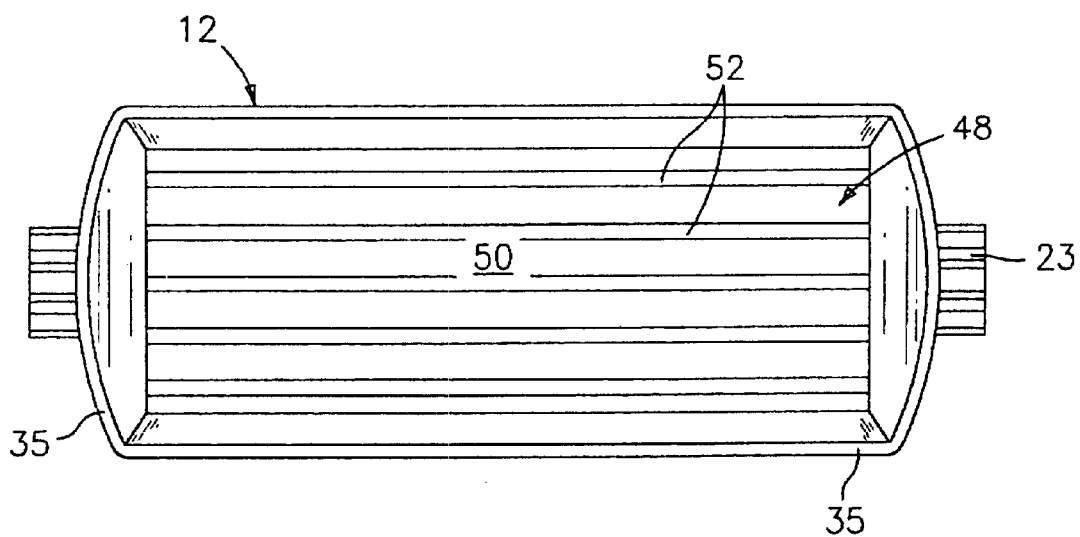
FIG. 8 shows the view taken along line 8—8 of FIG. 4.

As mentioned above and as best shown in FIG. 8, filter unit 12 also includes the filtering element 50 which is disposed within chamber 48 of the hood 30. Preferably, filtering element 50 includes a plurality of grooves 52 which capture and filter the smoke, fumes and contaminants as the smoke, fumes and contaminants are drawn therethrough. It is envisioned that the filtering element 50 may be selectively removed and/or replaced for cleaning and/or replacement purposes. Further, it is also envisioned that the filter unit 12 may include a variety of different filtering elements 50 which may be easily and quickly interchanged depending upon the type of food being cooked. For example, a charcoal-based filtering element 50 may be inserted within chamber 48 to diffuse the smoke, fumes and contaminants resulting from grilling fish.

Figure 3:
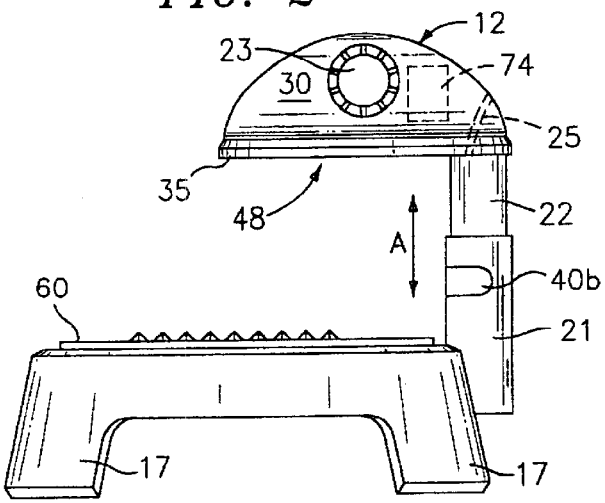
FIG. 3 is a right side view of the indoor grill of FIG. 1 with a fan motor shown in phantom.
Figure 5:
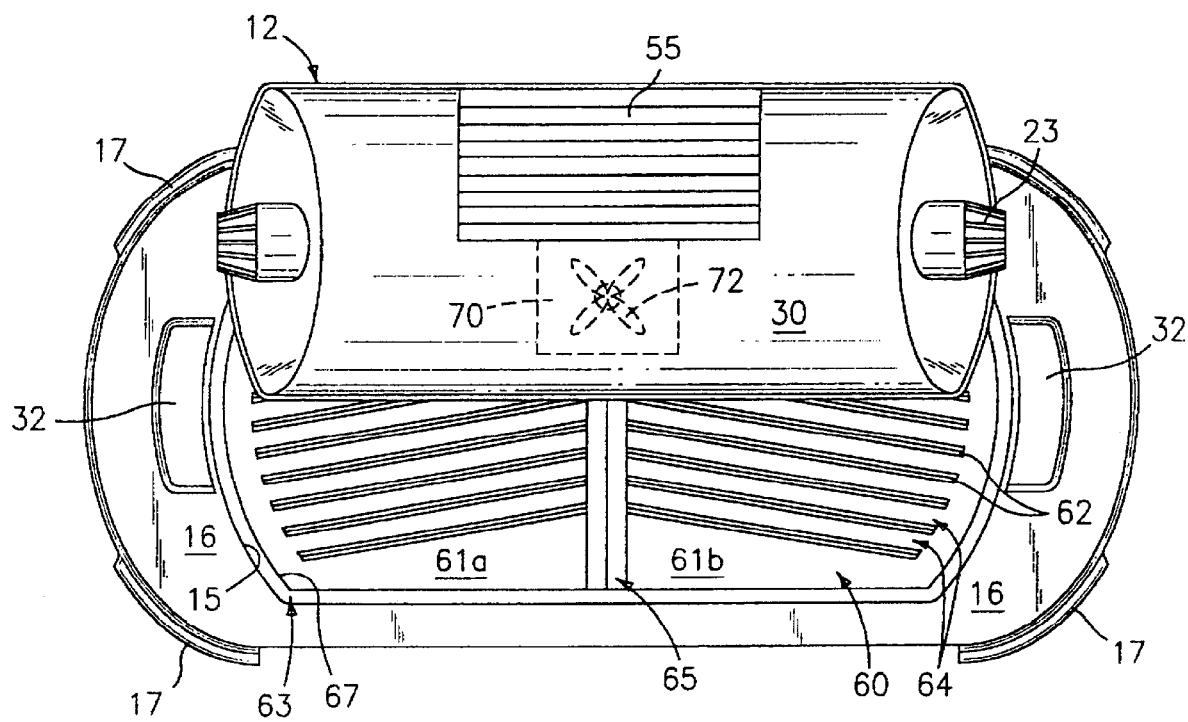
FIG. 5 is a top view of the indoor grill of FIG. 1 with a ventilation system shown in phantom.

Filter unit 12 also includes a ventilation system 70 which has a rotating fan 72 and motor 74 (both shown in phantom) disposed within the hood 30 (See FIGS. 3 and 5). As can be appreciated, fan 72 is rotated so as to create a negative air flow which draws the smoke, fumes and contaminants into and through the filtering element 50. The filtered and decontaminated exhaust is then dispersed through a diffuser 55 disposed on the outside of hood 30. As best shown in FIG. 3, motor 74 may include a switch 23 which adjusts the rotational speed of fan 72 to control the negative airflow through the filtering element 50.

Figure 2:
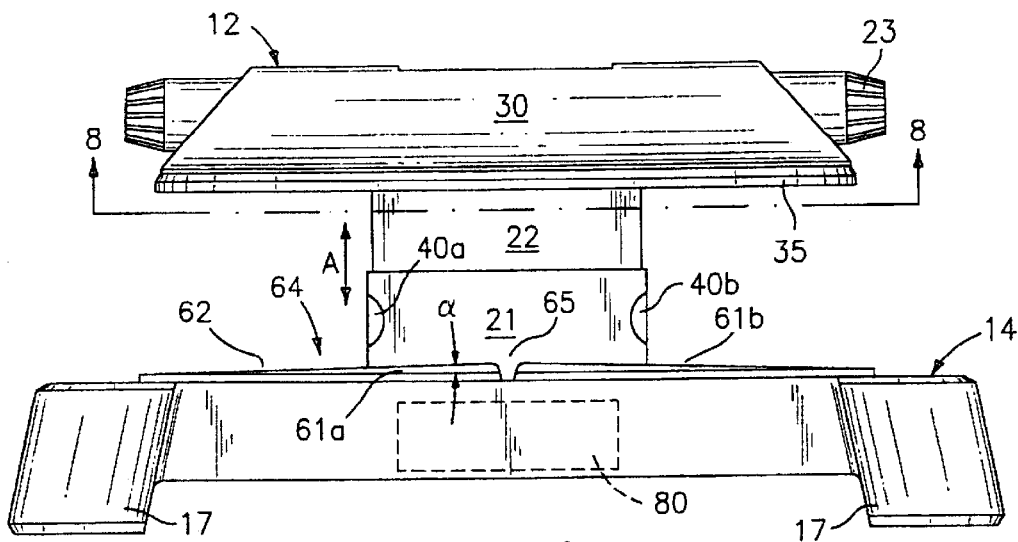
FIG. 2 is a front view of the indoor grill of FIG. 1.
Figure 4:
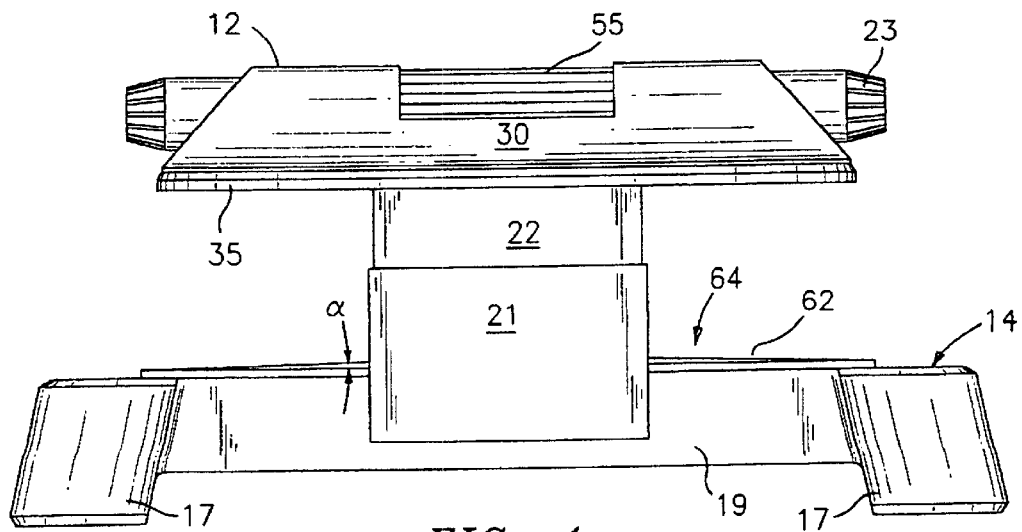
FIG. 4 is a rear view of the indoor grill of FIG. 1.

Filter unit 12 also includes a post 22 which connects to the hood 30 and extends downwardly therefrom (See FIGS. 2, 3 and 4). Preferably, post 22 is dimensioned for telescopic engagement with stanchion 21 such that the filter unit 12 may be selectively vertically positioned relative to base 14 at various locations along line "A" (See FIGS. 2 and 3). It is envisioned that the filter unit 12 can readily be raised or lowered for storage purposes and/or cooking purposes.

Figure 7:
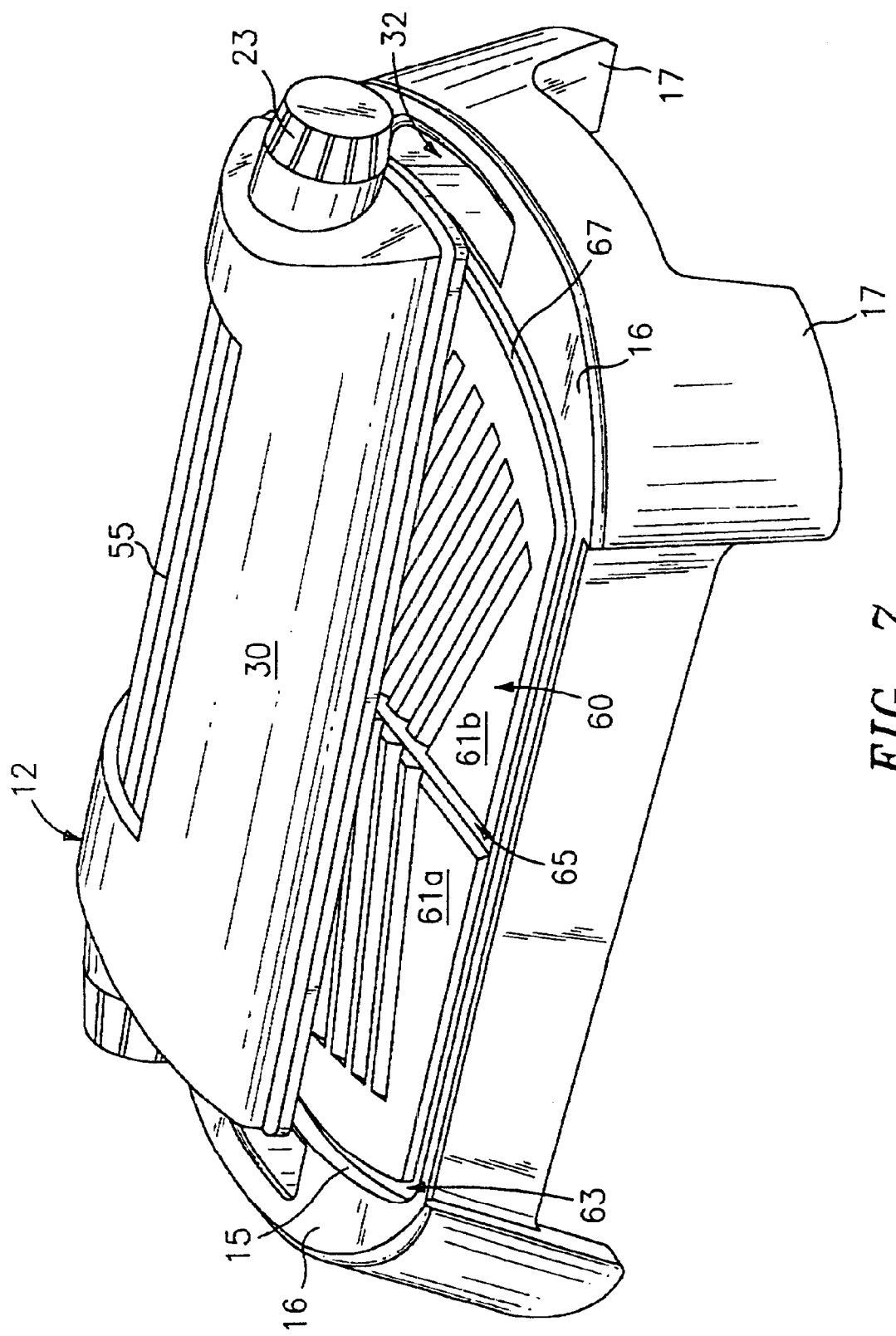
FIG. 7 is a top, perspective view of the indoor grill of FIG. 1 showing the filter unit in a collapsed, non-telescoped, position.

Preferably, a pair of opposing locking tabs 40a and 40b may be associated with post 22 and/or stanchion 21 to facilitate movement of the filter unit 12 along line "A" (See FIGS. 2 and 3). More particularly, opposing tabs 40a and 40b are depressed simultaneously to lower and/or raise post 22 within stanchion 21 to a desired position along line "A" and releasing opposing tabs 40a and 40b lock filter unit 12 in position above grilling surface 60. In this manner, the filter unit 12 may be selectively moved from a first, cooking position as best illustrated in FIG. 1 to a second, reduced configuration for storage purposes as best illustrated by FIG. 7. It is envisioned that various mechanical and/or electrical mechanisms may be employed to selectively position and lock the filter unit 12 at desired positions relative to the base 14, e.g., knobs, levers, rack and pinion, etc.

As best shown in FIG. 3, filter unit 12 may be connected to post 22 by a hinge 25 which allows the filter unit 12 to be pivoted relative to the base 14. As can be appreciated, the pivotal movement of the filter unit 12 facilitates removal of the filtering element 50 from chamber 48 and also simplifies cleaning of the grilling surface 60.

As mentioned above, the recess 15 of top surface 16 is dimensioned to seat grilling surface 60. Preferably, grilling surface 60 is contoured and includes a series of ridge-like projections 62 which extend upwardly therefrom and which define a corresponding plurality of grooves 64 therebetween. It is envisioned that when grilling surface 60 is heated via gas or electricity and the food is placed atop projections 62, fat and various other cooking excretions will drip into grooves 64 and the resulting smoke, fumes and contaminants which emanate from the grilling surface will be drawn upwardly into intake hood 30 and through filtering element 50 as described above.

Preferably, the contoured shape of grilling surface 60 will direct the fat, grease particles and other cooking excretions through the grooves 64, away from the food and towards a grease container or trap 80. For example and as best shown in FIGS. 2 and 4, grilling surface 60 may be bifurcated into two discrete cooking areas 61a and 61b separated by a central channel 65. Each cooking area 61a and 61b may be contoured at an angle α relative to top surface 16 and towards central channel 65 such that when grilling the fat and other cooking excretions dripping from the food will trickle within the grooves 64 away from central aperture 65 and toward an outer periphery 67 of the grilling surface 60. As best shown in FIGS. 1 and 5, the inner periphery 15 of top surface 16 and the outer periphery 67 of grilling surface 60 define a furrow or conduit 63 therebetween for collecting the fat, grease and other cooking excretions from grooves 64. It is envisioned that furrow 63 can also be dimensioned to further direct the fat and other cooking excretions into the grease container or trap 80 which is preferably disposed within the base 14. As can be appreciated, the trap 80 may be selectively removed for cleaning purposes.

Figure 6:
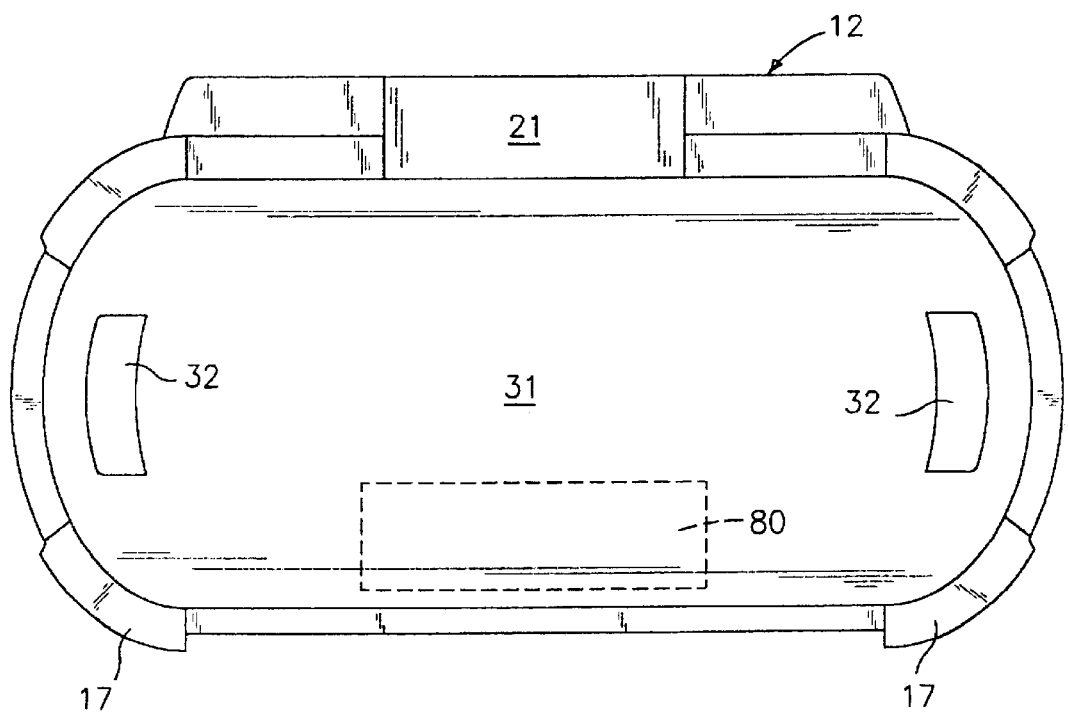
FIG. 6 is a bottom view of the indoor grill of FIG. 1 showing the grease trap in phantom.

As best shown in FIGS. 1, 5 and 6, base 14 may also include a pair of handles 32 which permit easy handling of the grill 10 for cleaning and/or transport purposes. It is envisioned that handle 32 may be inset or disposed through base 14 or, alternatively, handles 32 may extend upwardly from the top surface 16 (not shown). In some cases it may be preferable to manufacture handles 32 to include an insulating sleeve (not shown) which insulates the handles 32 from the grilling surface 60 and permits handling of the grill 10 immediately following grilling.

From the foregoing and with reference to the various drawings, those skilled in the art will appreciate that certain modifications may be made to the present disclosure without departing from the scope of the same. For example, although the drawings do not show a specific electrical connection for the ventilation system 70 of the filter unit 12, it is contemplated that the filter unit 12 may be either battery operated, rechargeable and/or require connection to an electrical power source.

There have been described and illustrated herein several embodiments of an indoor grill and while particular embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of preferred embodiments. Those skilled in the art will envision other modifications within the scope and spirit of the claims appended hereto.

What is claimed is:

1. A grill for indoor cooking, comprising:
   a base which includes an integral grilling surface on a top portion thereof and a stanchion which extends vertically from said base;
   a filter unit which includes:
      a hood having a post which depends therefrom, said post dimensioned to telescopically engage said stanchion such that said filter unit is selectively positionable in a vertical direction relative to the base;
      a selectively removable filtering element disposed within said hood for removing contaminants from a medium as the medium passes therethrough, said medium being natural by-products which emanate from said grilling surface into the air during grilling; and
   a ventilation system for drawing said medium and said contaminants through the filtering element.

2. A grill for indoor cooking according to claim 1 wherein said filter unit includes a hinge which permits pivotable movement of the filter unit relative to the base.

3. A grill for indoor cooking according to claim 1 wherein said stanchion includes at least one locking tab for selectively positioning and locking the filter unit relative to the base.

4. A grill for indoor cooking according to claim 1 the ventilation system includes a motor which operates at least one fan for creating an air flow to draw the medium and contaminants through the filtering element.

5. A grill for indoor cooking according to claim 4 wherein the motor in includes a switch which regulates the speed of the fan and the resulting air flow of the medium and contaminants through the filtering element.

6. A grill for indoor cooking according to claim 1 wherein said hood includes an intake chamber defined therein, the intake chamber being configured for selective reception and engagement of the filtering element.

7. A grill for indoor cooking according to claim 1 wherein the grilling surface is contoured.

8. A grill for indoor cooking according to claim 1 wherein said base includes an inner peripheral edge which defines a furrow between said inner peripheral edge and said grilling surface, said furrow being dimensioned to collect cooking excretions which result during cooking.

9. A grill for indoor cooking according to claim 8 wherein said grilling surface includes a plurality of raised projections having grooves defined therebetween, said projections and grooves being dimensioned to direct the flow of cooking excretions which result during cooking into said furrow.

10. A grill for indoor cooking according to claim 9 wherein said base includes a trap and said projections, grooves and furrow cooperate to channel the cooking excretions into said trap during cooking.

11. A grill for indoor cooking according to claim 10 wherein said trap is selectively removable from said base.

12. A grill for indoor cooking, comprising:
    a base which includes a grilling surface on a top portion thereof;
    a filter unit which includes:
       a hood having which is selectively positionable in a vertical direction relative to the base;
       a selectively removable filtering element disposed within said hood for removing contaminants from a medium as the medium passes therethrough, said medium being natural by-products which emanate from said grilling surface into the air during grilling; and
    a ventilation system for drawing said medium and said contaminants through the filtering element.

13. A grill for indoor cooking according to claim 12 wherein said filter unit includes a hinge which permits pivotable movement of the filter unit relative to the base.

14. A grill for indoor cooking according to claim 12 the ventilation system includes a motor which operates at least one fan for creating an air flow to draw the medium and contaminants through the filtering element.

15. A grill for indoor cooking according to claim 4 wherein the motor includes a switch which regulates the speed of the fan and the resulting air flow of the medium and contaminants through the filtering element.

16. A grill for indoor cooking according to claim 12 wherein said hood includes an intake chamber defined therein, the intake chamber being configured for selective reception and engagement of the filtering element.

17. A grill for indoor cooking according to claim 12 wherein the grilling surface is contoured.

18. A grill for indoor cooking according to claim 12 wherein said base includes an inner peripheral edge which defines a furrow between said inner peripheral edge and said grilling surface, said furrow being dimensioned to collect cooking excretions which result during cooking.

19. A grill for indoor cooking according to claim 18 wherein said grilling surface includes a plurality of raised projections having grooves defined therebetween, said projections and grooves being dimensioned to direct the flow of cooking excretions which result during cooking into said furrow.

20. A grill for indoor cooking according to claim 19 wherein said base includes a trap and said projections, grooves and furrow cooperate to channel the cooking excretions into said trap during cooking.

21. A grill for indoor cooking according to claim 20 wherein said trap is selectively removable from said base.

22. A grill for indoor cooking according to claim 12 wherein the filter unit is movable from a first, extended configuration for use during cooking to a second, reduced configuration for storage purposes.

* * * * *